United States Patent Office 3,341,222
Patented Sept. 12, 1967

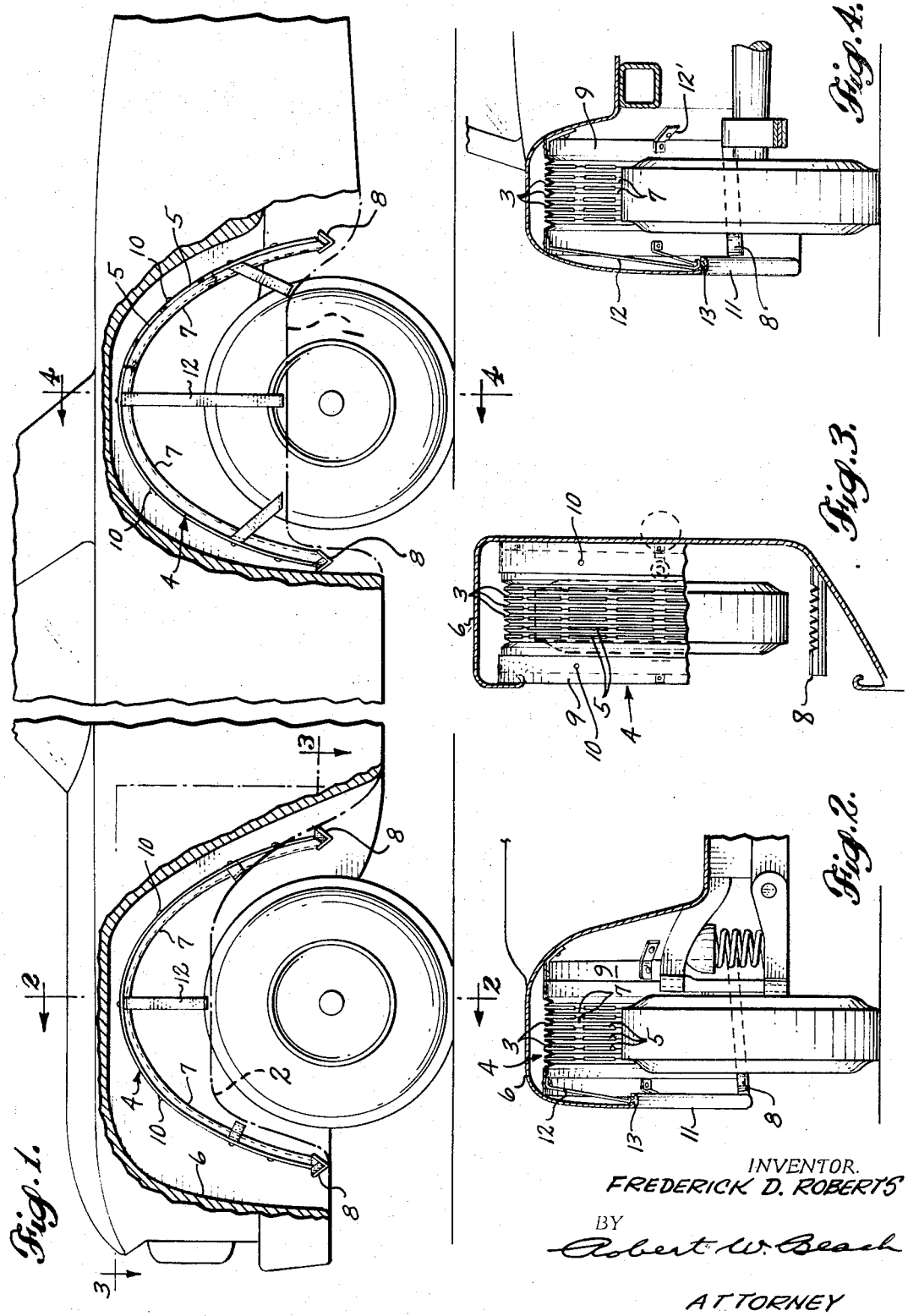

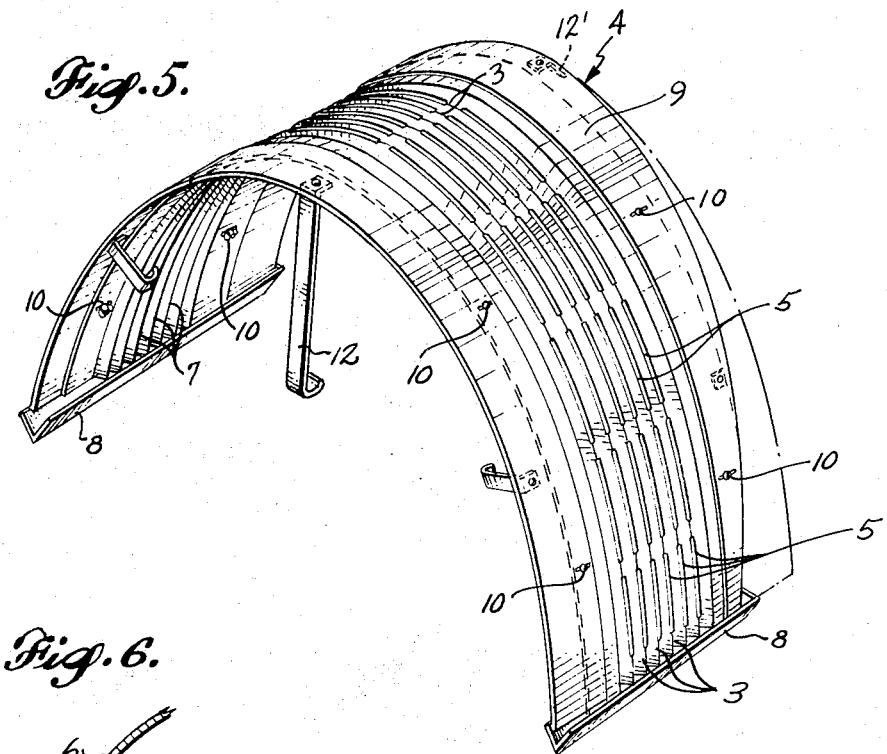
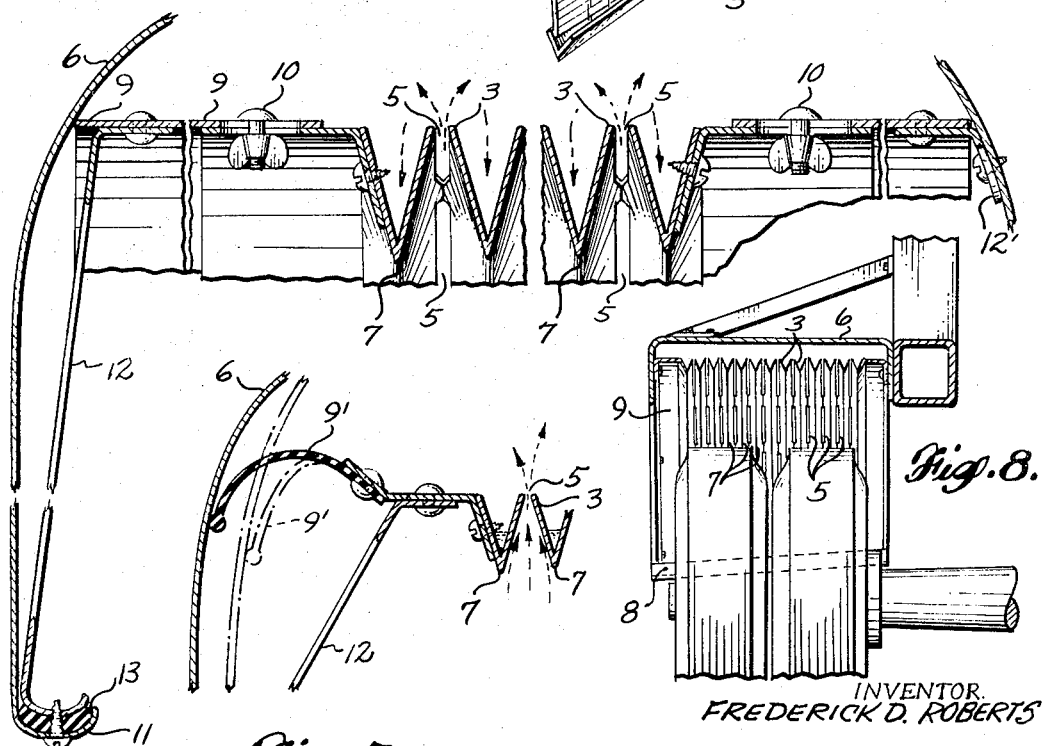

3,341,222
VEHICLE WHEEL SPRAY COLLECTOR
Frederick D. Roberts, Box 123, Star Rte.,
Kingston, Wash. 98346
Filed Sept. 10, 1965, Ser. No. 486,389
13 Claims. (Cl. 280—154.5)

ABSTRACT OF THE DISCLOSURE

An arch overlying a vehicle wheel has a corrugated portion forming elongated downwardly flaring channels and alternate intermediate upwardly flaring channels. Through arcuate slots extending circumferentially of the collector in the bottoms of the downwardly flaring channels spray passes to strike a barrier above the spray collector by which it is reflected into the upwardly opening channels to flow circumferentially through them into collecting troughs extending axially at opposite ends of the collector and which extend lengthwise laterally beyond the vehicle wheel to deposit the water where it cannot again be contacted and flung by the wheel.

---

It is a principal object of this invention to provide a spray collector which can be applied over a wheel for the purpose of trapping spray flung upward from the wheel, collecting it and depositing it in a manner such that it cannot again contact the wheel.

In accomplishing this principal object it is a further object to provide such a spray collector which is effective in operation, yet which will be compact and economical.

A further object is to provide such a spray collector which is easy to install on a vehicle, and which can be adapted readily to fit a reasonable range of sizes and shapes of wheel recesses.

The foregoing objects can be accomplished by the use of a spray collector in the shape of an arch supported in position overlying the vehicle wheel. The spray passing through arcuate slots in the bottoms of the downwardly-opening collector channels strikes a barrier from which it is deposited into circumferential grooves to flow downward into collecting troughs inclined transversely relative to the direction of vehicle movement so as to deposit the collected water laterally beyond the vehicle wheel.

FIGURE 1 is a side elevation of a representative automobile equipped with spray collectors in accordance with the present invention, parts being broken away.

FIGURE 2 is a vertical transverse section through a front wheel installation of a spray collector according to the present invention on line 2—2 of FIGURE 1, and FIGURE 3 is a horizontal section through such an installation taken on line 3—3 of FIGURE 1.

FIGURE 4 is a vertical transverse section through a spray collector installation for a rear vehicle wheel on line 4—4 of FIGURE 1.

FIGURE 5 is a top perspective of a spray collector liner, with parts broken away.

FIGURE 6 is an enlarged transverse vertical section through a collector installation on line 4—4 of FIGURE 1, parts being broken away.

FIGURE 7 is a transverse vertical section through a spray collector installation on an enlarged scale showing an alternate type of structure with parts broken away.

FIGURE 8 is a transverse vertical section through a spray collector installation for dual wheels.

In rainy weather automotive vehicle wheels pick up water from hard-surfaced roads and, particularly at high speeds, the centrifugal force produced by the spinning wheels flings droplets of water from the circumferences of the wheels as fine spray, or mist. Such spray, or mist, is hurled, especially from the rear wheels of a vehicle, behind and to the sides of the vehicle to an extent such that the vision of the driver of a following vehicle is greatly impaired, if not actually obscured, even though such following vehicle may have its windshield wipers in operation. Such spray flung to the side of a vehicle may strike pedestrians. Not only is such water picked up from the surface of the road generally, but the condition is greatly aggravated from time to time when the vehicle passes through puddles of water on the road, or sheets of water flowing across the road.

Not only is such spray, or mist, flung from an automobile wheel simply by being picked up from the road and hurled outwardly or rearwardly, but a large part of such water, if not most of it, is flung upward against the conventional fender arched above the vehicle wheel, from which the water drops back down so that a large part of it strikes the upper portion of the rotating wheel, so that the water is again flung by the wheel on such second contact. Such reflung moisture may again strike the fender and drop back onto the wheel. As a result of this action water is not only picked up by the periphery of the wheel and flung once, but may reengage the wheel and be flung by it repeatedly, so that when the water particles are finally flung rearward, or outward, from the wheel recess they are in finely divided form and produce a mist of small drops which tends to be suspended in the air to a greater extent than large drops of water would be suspended.

The action of the spray collector installation of the present invention is first to trap a large proportion of the spray flung from the periphery of an automobile wheel and second to convert such spray into streams of water which will be diverted from reengagement with the vehicle wheel and will be deposited back onto the ground without the production of a cloud of spray, or mist, which would impair the vision of the driver of a following vehicle, or wet a pedestrian passed by the vehicle. As shown in FIGURES 1 to 4, in particular, such spray collectors can be installed in, and supported from, the fenders of a conventional passenger automobile, or such a spray collector installation can be made for any truck fender installation even though such installation may cover dual truck or bus wheels as indicated in FIGURE 8.

Usually the rear fender 1 of an automobile projects downward farther than the front fender 2. It is, however, desirable to provide a spray collector installation which can be applied either to a front wheel recess or to a rear wheel recess. In any event, however, the general structure of the collector installation will be the same in both cases and variations will only be such as to enable the collector to be installed appropriately in the particular wheel recess. The principal component of the spray collector mechanism is shown best in FIGURES 5 and 6 as an arched liner or shield 4 having arcuate corrugations extending circumferentially of the shield. As shown in FIGURE 6, these corrugations form downwardly opening channels beneath crests 3. Arcuate slots 5 are provided in such crests through which spray flung by the wheel's periphery can pass.

Behind the shield 4 is a backing sheet 6 spaced outward from the shield, but curved generally in conformance with the shield, which backing sheet may be the automobile's fender. Spray passing through the slots 5 will impinge against this backing sheet and fall down onto the convex side of the corrugated shield. In such side of the shield troughs 7 are formed between the slotted crests in which water will collect instead of dropping back down onto the periphery of the wheel. Such water will flow downward in opposite directions from the top of the shield into collecting gutters 8 extending across the lower ends of the shields and sloping transversely of the direction of movement of the vehicle preferably toward the outer side of the wheel recess.

As shown best in FIGURES 2 and 4, the corrugated portion of the shield should preferably be of a width at least as great as the thickness of the automobile wheel. The width, depth and flare of each corrugation forming a spray-collecting channel is not critical, but such channel should be proportioned with respect to the width of the slot so that the spray collected by the channel will pass through the slot instead of clogging it, so that some of the water will not pass through the slot but instead will fall back down onto the periphery of the rotating wheel. Also, the width of each slot should be made great enough so as to pass the spray collected by its channel, but the slot should not be so wide that any appreciable water which has passed through the slot will strike the backing sheet 6 and fall back through the slot.

Also, it is desirable for the shield 4 to be located close to the wheel so as to collect as much spray flung from it as possible, but in order to simplify installation of the shield it is desirable for it to be mounted stationarily beneath the fender so that it is necessary to provide sufficient clearance between the wheel and the shield to accommodate the relative vertical movement between the wheel and the fender occasioned by the combination of the vehicle loading and road bumps. The spacing between the shield 4 and the backing sheet 6 is of less importance, although there must be reasonable clearance between the shield and backing sheet. Since the shield is mounted in the wheel recess, however, it cannot be spaced very far from the wall of the wheel recess without curtailing the movement of the wheel relative to the wheel recess for different loadings of the vehicle and road conditions.

While in the installations shown in FIGURES 2 and 4, the backing sheet 6 is shown as the inner surface of the fender or wheel recess the backing sheet could be separate from the inner surface of the wheel recess and spaced from it so that it would be located closer to the shield 4, if desired. Also, such backing sheet could be utilized as the structure for mounting the spray collecting shield in the wheel recess. In FIGURES 5 and 6 of the drawings in particular, however, a different type of construction for mounting the spray-collecting shield in the wheel recess is shown. Whatever type of mounting is utilized it is preferred that it be adaptable for use on automobiles of different makes and models, despite variations in wheel size and wheel recess size and construction.

In FIGURES 2, 3 and 4 the spray collector shield 4 is shown as spanning the entire width of the wheel recess. The spray collector construction includes side extensions 9, each having one edge connected to the corrugated central portion 4 and its opposite edge engageable with the adjacent side of the wheel well. The effective width of these extensions can be altered to fit wheel recesses of different sizes by making the side extensions adjustable in width. For this purpose each side extension is shown as including overlapping elements secured together by adjustable slot and bolt connections 10. The widths of the side extensions can therefore be altered so that the entire assembly of the corrugated central portion and the extensions 9 will fit the width of the wheel recess and the corrugated structure will be centered over the wheel.

Virtually all automobile fenders have a marginal groove 11 along the edge of the fender skirt opening inwardly. The outer edge of the spray collector can be supported by legs 12 having their upper ends secured to the side extension 9, preferably adjustable, and the lower end engaged in the marginal groove. A resilient wear member 13 should be interposed between the lower end of each leg and the marginal groove. The legs 12' at the opposite side of the spray collector can be secured to the wall of the wheel recess by sheet metal screws, or bolts.

When thius held in place at least a large part of the spray flung upward by the centrifugal force produced by the rotating wheel will be collected by the downwardly facing channels of the corrugated spray collector 4, and guided through the slots 5 to the backing 6. While such slots are preferably not continuous or continuously uninterrupted throughout the entire arch of the spray collector because of the necessity of tying together the adjacent corrugations, most of the water flung upward by the wheel will pass through the slots 5. Each channel may, for example, be 1 inch to 2 inches wide at the most, and taper toward the slot 5, which may be ⅛ of an inch to ⅜ of an inch in width, for example. The depth of the channels may be from 1 inch to 2 inches, for example. While the particular dimensions and proportions of slot width and channel width, depth and flare may be selected, the important consideration is for as much as possible of the spray thrown by the wheel to pass through the slots 5 and be collected in the trough 7 for discharge in streams from the gutters 8.

The corrugated spray collector structure 4 can be made as a unitary element, or in sections of any desired size which are secured or bonded together. The material used for this structure may be plastic, or metal, and it may be of molded or formed construction.

In FIGURE 7 the structure of the spray collector generally can be like that of FIGURE 6, except that in this instance the side extensions 9' are made of pliable material instead of rigid material, so that they can yield when their edges bear on the sides of the wheel recess. This type of construction will be accommodated automatically to wheel recesses of different widths by the varying degree of bend formed in the extensions. Except for such extensions the remainder of the spray collector structure and the mounting structure can be similar to that described above. Such extensions can be of rubber sheet.

In FIGURE 8 an adaptation of the spray collector of the present invention to dual truck or bus wheels is shown. In this instance the corrugated portion 4' of the spray collector is much wider than that used for single wheel installations. Preferably such corrugated channel slot and trough construction 4' extends for a width at least as great as the overall width of the entire dual wheel assembly. The backing sheet 6' can be a specially constructed fender, or the conventional truck or bus fender surface. In this instance the corrugated structure 4' is shown as being supported by the backing 6' and such backing is suitably supported by braces. The operation of this type of spray collector construction is similar to that described with reference to the installation for single wheels.

I claim:

1. A vehicle wheel spray collector comprising a spray-collecting arch having on its concave side spray-collecting channels flaring downwardly from crests of such channels and apertures through such channel crests, means supporting said spray-collecting arch over a vehicle wheel with its arcuate shape in a position generally corresponding to the arcuate upper side of such wheel for passage through said apertures of spray thrown by such vehicle wheel into said spray-collecting channels, and backing means overlying said spray-collecting arch against which water passing through such apertures impinges to arrest its upward movement.

2. The vehicle wheel spray collector defined in claim 1, in which the spray-collecting channels are elongated circumferentially of the arch and the apertures are slots elongated circumferentially of the arch.

3. The vehicle wheel spray collector defined in claim 2, in which the convex side of the spray-collecting arch has troughs elongated circumferentially of the arch and located respectively between adjacent slots, and the water impinging against the backing means being reflected thereby into said troughs.

4. The vehicle wheel spray collector defined in claim 1, in which the vehicle wheel is received in a recess and the opposite arcuate edge portions of the spray-collecting arch are shaped substantially to engage the inner wall of such recess.

5. The vehicle wheel spray collector defined in claim 4, in which an arcuate edge portion of the spray-collecting arch is adjustable to vary the effective width of such arch.

6. The vehicle wheel spray collector defined in claim 5, in which an arcuate edge portion of the spray-collecting arch is separate from the central portion of such arch, such portions are disposed in partially overlapping relationship, and connecting means connecting said edge portion and said central portion in various relationships overlapping to different degrees.

7. The vehicle wheel spray collector defined in claim 5, in which an arcuate edge portion of the spray-collecting arch is made of pliable material for yielding to contact a side of the wheel recess.

8. The vehicle wheel spray collector defined in claim 1, in which a fender extends over the spray-collecting arch, and the supporting means includes supporting legs engageable with the vehicle fender.

9. The vehicle wheel spray collector defined in claim 8, in which at least one of the supporting legs is engageable with an inturned fender flange.

10. The vehicle wheel spray collector defined in claim 2, in which the depth of a channel radially of the arch is at least substantially as great as the width of the channel mouth.

11. The vehicle wheel spray collector defined in claim 3, and a gutter at a circumferential end of the spray-collecting arch communicating with the corresponding ends of the troughs on the convex side of the spray-collecting arch for receiving water therefrom and conveying such water axially of the spray-collecting arch beyond such arch.

12. The vehicle wheel spray collector defined in claim 2, in which a plurality of slots are located in the crest of each spray-collecting channel, and the ends of adjacent slots are spaced apart circumferentially of the spray-collecting arch.

13. A vehicle wheel spray collector comprising a spray-catching means overlying a vehicle wheel and including a member apertured for passage upwardly therethrough of spray thrown by such vehicle wheel, means at the upper side of said apertured member for arresting spray passing through apertures of said apertured member, and upwardly-opening trough means at the spray-discharge side of said apertured member for collecting spray that has passed therethrough and conveying it to a location out of registry with the periphery of such vehicle wheel.

References Cited

UNITED STATES PATENTS 2,940,773   6/1960   Eaves _____ 280—154.5

BENJAMIN HERSH, *Primary Examiner.*

MILTON BUCHLER, *Examiner.*

L. D. MORRIS, *Assistant Examiner.*